US012677739B2

(12) United States Patent
Singh et al.

(10) Patent No.: US 12,677,739 B2
(45) Date of Patent: Jul. 14, 2026

(54) UNTHRESHED GRAIN LOSS DETECTION AND ANALYSIS

(71) Applicant: Deere & Company, Moline, IL (US)

(72) Inventors: Rana Shakti Singh, Ramgarh (IN);
Nathan R. Vandike, Geneseo, IL (US)

(73) Assignee: Deere & Company, Moline, IL (US)

( * ) Notice: Subject to any disclaimer, the term of this patent is extended or adjusted under 35 U.S.C. 154(b) by 386 days.

(21) Appl. No.: 18/458,325

(22) Filed: Aug. 30, 2023

(65) Prior Publication Data

US 2025/0072325 A1     Mar. 6, 2025

(51) Int. Cl.
 *A01D 41/127*     (2006.01)
 *G06T 7/20*      (2017.01)
 *G06V 20/10*     (2022.01)

(52) U.S. Cl.
 CPC ............ *A01D 41/1271* (2013.01); *G06T 7/20* (2013.01); *G06V 20/188* (2022.01); *G06T 2207/30188* (2013.01)

(58) Field of Classification Search
 CPC .............. G06V 20/188; A01D 41/1271; A01D 41/1277; G06T 7/20; G06T 2207/30188
 See application file for complete search history.

(56) References Cited

U.S. PATENT DOCUMENTS

| | | |
|---|---|---|
| 9,226,449 B2 | 1/2016 | Bischoff |
| 10,989,833 B2 | 4/2021 | Ferren et al. |

| | | | |
|---|---|---|---|
| 2017/0071125 A1 | 3/2017 | Pfeiffer et al. | |
| 2020/0375104 A1 | 12/2020 | Yu et al. | |
| 2022/0071088 A1 * | 3/2022 | Hermann | .............. A01F 12/448 |
| 2022/0132736 A1 | 5/2022 | Meyers et al. | |
| 2022/0354055 A1 | 11/2022 | Hermann | |
| 2023/0157212 A1 | 5/2023 | Jung et al. | |
| 2024/0130281 A1 † | 4/2024 | Maney | |

FOREIGN PATENT DOCUMENTS

| | | | | |
|---|---|---|---|---|
| WO | WO-2024036401 A1 * | 2/2024 | ......... | A01D 41/1276 |

OTHER PUBLICATIONS

Agriculture MDPI, "Improving Cleaning Performance of Rice Combine Harvesters by DEM-CFD Coupling Technology", Ding et al. (Sep. 13, 2022)(19 pages).

* cited by examiner
† cited by third party

*Primary Examiner* — Tracy Mangialaschi
(74) *Attorney, Agent, or Firm* — Lucian Wayne Beavers; Patterson Intellectual Property Law, PC

(57)           ABSTRACT

A method of operating a grain harvesting machine includes: capturing images of a crop material flow in an image capture area of the grain harvesting machine, the crop material flow including known grain elements, known material other than grain (MOG) elements, and unknown elements not yet identified as grain or MOG; identifying one or more of the unknown elements in the images; determining a velocity of each of the identified unknown elements; based on the velocity of each of the identified unknown elements, determining whether each of the identified unknown elements is grain or MOG; and controlling a subsystem of the grain harvesting machine at least in part based upon the determination of whether each of the identified unknown elements is grain or MOG.

18 Claims, 5 Drawing Sheets

UNTHRESHED GRAIN LOSS DETECTION AND ANALYSIS

BACKGROUND OF THE INVENTION

1. Field of the Invention

The present application relates to systems for determining grain loss and grain quality in the operation of a grain harvesting machine.

2. Description of the Prior Art

When operating a grain harvesting machine it is desirable to measure the amount of grain loss in the stream of exhausted plant material that passes through the grain harvesting machine and flows back onto the ground. It is also desirable to evaluate the grain quality of grain that is captured. Accurate measurement of grain loss and grain quality enables the various systems of the grain harvesting machine to be properly adjusted to reduce the grain loss.

There is a continuing need for improvements in such grain loss measuring systems.

SUMMARY OF THE INVENTION

In a first embodiment a method of operating a grain harvesting machine includes: capturing images of a crop material flow in an image capture area of the grain harvesting machine, the crop material flow including known grain elements, known material other than grain (MOG) elements, and unknown elements not yet identified as grain or MOG; identifying one or more of the unknown elements in the images; determining a velocity of each of the identified unknown elements; based on the velocity of each of the identified unknown elements, determining whether each of the identified unknown elements is grain or MOG; and controlling a subsystem of the grain harvesting machine at least in part based upon the determination of whether each of the identified unknown elements is grain or MOG.

In another embodiment a grain harvesting machine for harvesting a crop material and separating the crop material into grain and material other than grain (MOG) includes a plurality of machine subsystems affecting separation of the grain from the MOG, at least one image capture sensor configured to capture images of a crop material flow in an image capture area of the grain harvesting machine, and a controller. The controller is configured to: identify one or more elements of the crop material flow in the images as known grain elements, known MOG elements, or unknown elements; determine a velocity of each of the identified unknown elements; determine whether each of the identified unknown elements is grain or MOG based on the velocity of each of the identified unknown elements; and control at least one of the subsystems of the grain harvesting machine at least in part based upon the determination of whether each of the identified unknown elements is grain or MOG.

Numerous objects, features and advantages of the embodiments set forth herein will be readily apparent to those skilled in the art upon reading of the following disclosure when taken in conjunction with the accompanying drawings.

DETAILED DESCRIPTION

When operating a grain harvesting machine it is desirable to measure the amount of grain loss in the stream of exhausted plant material that passes through the grain harvesting machine and flows back onto the ground. It is also desirable to evaluate the grain quality of grain that is captured. Accurate measurement of grain loss and grain quality enables the various systems of the grain harvesting machine to be properly adjusted to reduce the grain loss. The present disclosure relates to image-based measurement systems for measuring grain loss and grain quality. As used herein, "grain" may be any relevant agricultural material, including seeds, kernels, beans or the like.

One problem that has been encountered in prior image-based systems for measuring grain loss is the problem of identifying losses of unthreshed grain. Unthreshed grain can be difficult to identify using image-based systems because the grain itself is hidden, either fully or partially. In the case of wheat for example, the unthreshed wheat is hidden inside the hulls of the plant. In the case of canola or soybeans, as a further example, the unthreshed grain is hidden in the seed pods of the plant. If the unthreshed grain is not identified and measured, then the adjustment of machine parameters to reduce grain loss may not be optimized.

The present disclosure provides an image-based measurement system for measuring grain loss which provides an improved ability to identify and measure the grain loss, and particularly to more accurately identify and include a measurement of grain loss in the form of unthreshed grain. The system may also be used to evaluate grain quality. As used herein, discussions of "grain quality" refer to the degree to which the captured grain is completely threshed to remove all chaff and MOG material. By providing a measurement of captured unthreshed grain a determination of grain quality can be made.

Figure 1:
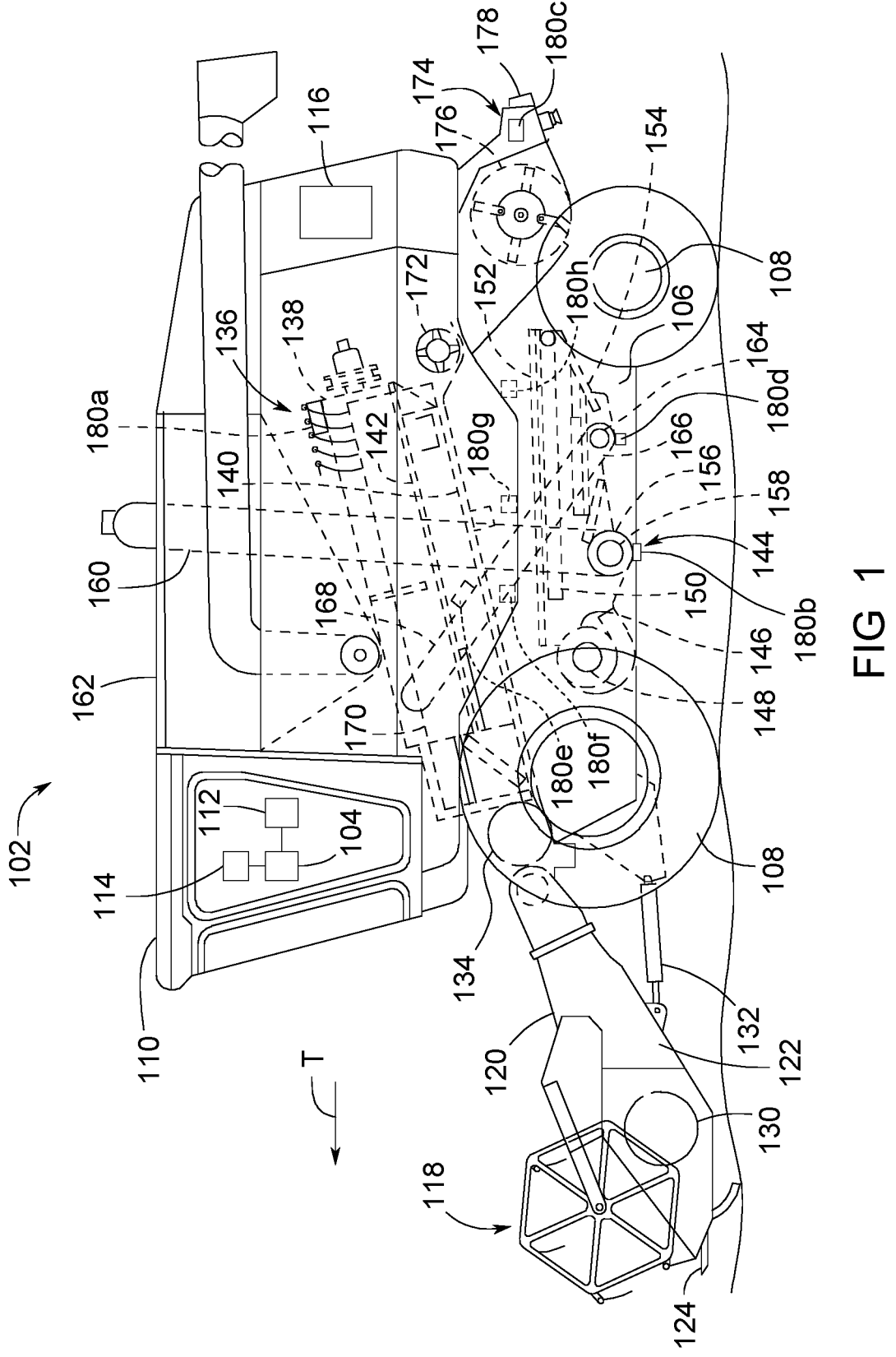
FIG. 1 is a schematic left side elevation view of a grain harvesting machine.

Referring now to FIG. 1, a grain harvesting machine 102 in the form of a combine harvester is shown. The grain harvesting machine 102 includes a controller 104 that controls and/or facilitates operation of various aspects of the grain harvesting machine 102.

As shown, the example grain harvesting machine 102 includes a chassis 106 with ground-engaging wheels 108 or tracks. The wheels 108 are rotatably mounted to the chassis 106 and engage with the ground to propel the grain harvesting machine 102 in a travel direction T. An operator's cab 110, also mounted to the chassis 106, houses an operator as well as various devices to control the harvester 102, such as one or more operator input devices 112 and/or display devices 114, further described below.

The wheels 108 and other devices of the harvester 102 are powered by an internal combustion engine 116 or other power source. The engine 116 may be operated based on commands from the operator and/or the controller 104.

A header 118 is mounted at the front of the chassis 106 of the grain harvesting machine 102 to cut and gather crop material from a field. The header 118 is supported by a feederhouse 120 pivotally mounted to the chassis 106. The header 118 includes a frame 122 supporting a cutter bar 124 that extends substantially across the length of the header 118 and that functions to cut crops along the ground. The header 118 may further include a mechanism for collecting the cut material from the cutter bar 124. In this example, the header 118 includes an auger 130 to transport the cut crop material towards the center of the header 118. Other examples may include one or more conveyors. The header 118 may include a header actuator 132 that functions to reposition the header 118 relative to the ground and/or in front and rearward directions. The feederhouse 120 may include, for example, an inclined conveyor (not shown) to transport cut crop material from the header 118 into the body of the grain harvesting machine 102.

After passing over a guide drum or feed accelerator 134, the crop material from the feederhouse 120 reaches a generally fore-aft oriented threshing device or separator 136. Other embodiments may include laterally oriented or other threshing devices (not shown). In the embodiment depicted, the separator 136 includes a rotor 138 on which various threshing elements are mounted. The rotor 138 rotates above one or more grated or sieved threshing baskets or concaves 140, such that crop material passing between the rotor 138 and the concaves 140 is separated, at least in part, into grain and chaff (or other "material other than grain" (MOG)). The concaves 140 may be opened and/or closed with one or more concave actuators 142 (schematically shown). The concave actuators 142, as well as further actuators associated with the concaves 140, may be operated based on commands from the operator and/or the controller 104. The MOG is carried rearward and released from between the rotor 138 and the concaves 140. Most of the grain (and some of the MOG) separated in the separator 136 falls downward through apertures in the concaves 140.

Agricultural material passing through the concaves 140 falls (or is actively fed) into a cleaning subsystem (or cleaning shoe) 144 for further cleaning. The cleaning subsystem 144 includes a fan 146, driven by a motor 148, that generates generally rearward air flow, as well as a sieve 150 and a chaffer 152. The sieve 150 and the chaffer 152 are suspended with respect to the chassis 106 by an actuation arrangement 154 that may include pivot arms and rocker arms mounted to disks (or other devices). As the fan 146 blows air across and through the sieve 150 and the chaffer 152, the actuation arrangement 154 may cause reciprocating motion of the sieve 150 and the chaffer 152 (e.g., via movement of the rocker arms). The combination of this motion of the sieve 150 and the chaffer 152 with the air flow from the fan 146 generally causes the lighter chaff to be blown upward and rearward within the grain harvesting machine 102, while the heavier grain falls through the sieve 150 and the chaffer 152 and accumulates in a clean grain trough 156 near the base of the grain harvesting machine 102.

A clean grain auger 158 disposed in the clean grain trough 156 carries the material to the one side of the grain harvesting machine 102 and deposits the grain in the lower end of a clean grain elevator 160. The clean grain lifted by the clean grain elevator 160 is carried upward until it reaches the upper exit of the clean grain elevator 160. The clean grain is then released from the clean grain elevator 160 and falls or is deposited into a grain tank 162.

Most of the grain entering the cleaning subsystem 144, however, is not carried rearward, but passes downward through the chaffer 152, then through the sieve 150. Of the material carried by air from the fan 146 to the rear of the sieve 150 and the chaffer 152, smaller MOG particles are blown out of the rear of the grain harvesting machine 102. Larger MOG particles and grain are not blown off the rear of the grain harvesting machine 102, but rather fall off the cleaning subsystem 144.

Heavier material carried to the rear of the chaffer 152 exits out of the grain harvesting machine 102. Heavier material carried to the rear of the sieve 150 falls onto a pan and is then conveyed by gravity downward into a grain tailings trough 164 in the form of "tailings," typically a mixture of grain and MOG. A tailings auger 166 disposed in the tailings trough 164 carries the grain tailings to a side of the grain harvesting machine 102 and into a grain tailings elevator 168. The grain tailings elevator 168 communicates with the tailings auger 166 at an inlet opening of the grain tailings elevator 168 where grain tailings are received for transport for further processing. At a top end of the tailings elevator 168, an outlet opening (or other offload location) 170 is provided (e.g., for return to the thresher).

In a passive tailings implementation, the grain tailings elevator 168 carries the grain tailings upward and deposits them on a forward end of the rotor 138 to be re-threshed and separated. A discharge beater 172 is provided for discharging material from the rotor 138. The now-separated MOG is released behind the grain harvesting machine 102 to fall upon the ground in a windrow or is delivered to a residue subsystem 174 that can include a chopper 176 and a spreader 178 to be chopped by the chopper 176 and spread on the field by the spreader 178. Alternatively, in an active tailings implementation, the grain tailings elevator 168 may deliver the grain tailings upward to an additional threshing unit (not shown) that is separate from the separator 136 and where the grain tailings are further threshed before being delivered to the main crop flow at the front of the cleaning subsystem 144.

The grain harvesting machine 102 may include one or more image capture sensors 180 arranged at one or more image capture areas 182 within the grain harvesting machine 102. Each image capture sensor 180 is arranged to capture images of a crop material flow in the respective image capture area of the grain harvesting machine 102. These images may be processed by the controller 104 as further described below, to measure the grain loss or the grain quality of the grain harvesting machine 102, to allow for informed adjustment of the various operating subsystems of the grain harvesting machine 102 so as to reduce the grain loss. Each image capture sensor 180 may be any suitable sensor type, including radar sensors, camera sensors, lidar sensors, infrared sensors, near infrared sensors and any other sensor suitable for providing images for spectral analysis.

There are multiple suitable locations within the grain harvesting machine 102 for location of the image capture sensors 180. Some of these are schematically shown in FIG. 1, with various specific locations identified by a suffix "a", "b", etc. It is noted that the locations are only generally shown. Within any given area of the machine the image capture sensor should be located and oriented so that it best views a moving air stream of air and entrained grain and MOG. Some locations may be for the purpose of evaluating grain quality at the location. Other locations may be for the purpose of evaluating grain loss. Some locations may be relevant to both grain quality and grain loss.

In a first example an image capture sensor 180*a* may be located in the area of the threshing device or separator 136. Data from sensor 180*a* may be representative of grain quality in the area of the sensor 180*a*, particularly if located in the upstream portions of the threshing device or separator 136. Data from sensor 180*a* may be representative of grain loss to the residue system if the sensor 180*a* is located on the downstream end of the threshing device or separator 136.

In another example an image capture sensor 180*b* may be located in the area of the cleaning shoe 144. Data from sensor 180*b* in the area of the cleaning shoe may be representative of grain quality of the finished separated grain product.

In a further example an image capture sensor 180*c* may be located in the area of the residue processing subsystem 174. Data from sensor 180*c* may be representative of grain loss through the residue processing subsystem 174.

In a still further example an image capture sensor 180*d* may be located in the area of the tailings handling system 164, 166 or in location 180*e* further along the grain tailings elevator 168. Data from sensors 180*d* or 180*e* may be representative of grain quality at those locations.

Further image capture sensors may be located at locations 180*f*, 180*g* and 180*h* at various locations successively downstream in the area above the sieve 150 and chaffer 152. The more upstream of those locations may provide data representative of grain quality at those locations. The more downstream of these locations may provide data representative of potential grain loss out the back of the machine 10 with the stream of chaff being blown out of the machine.

Figures 3, 4:
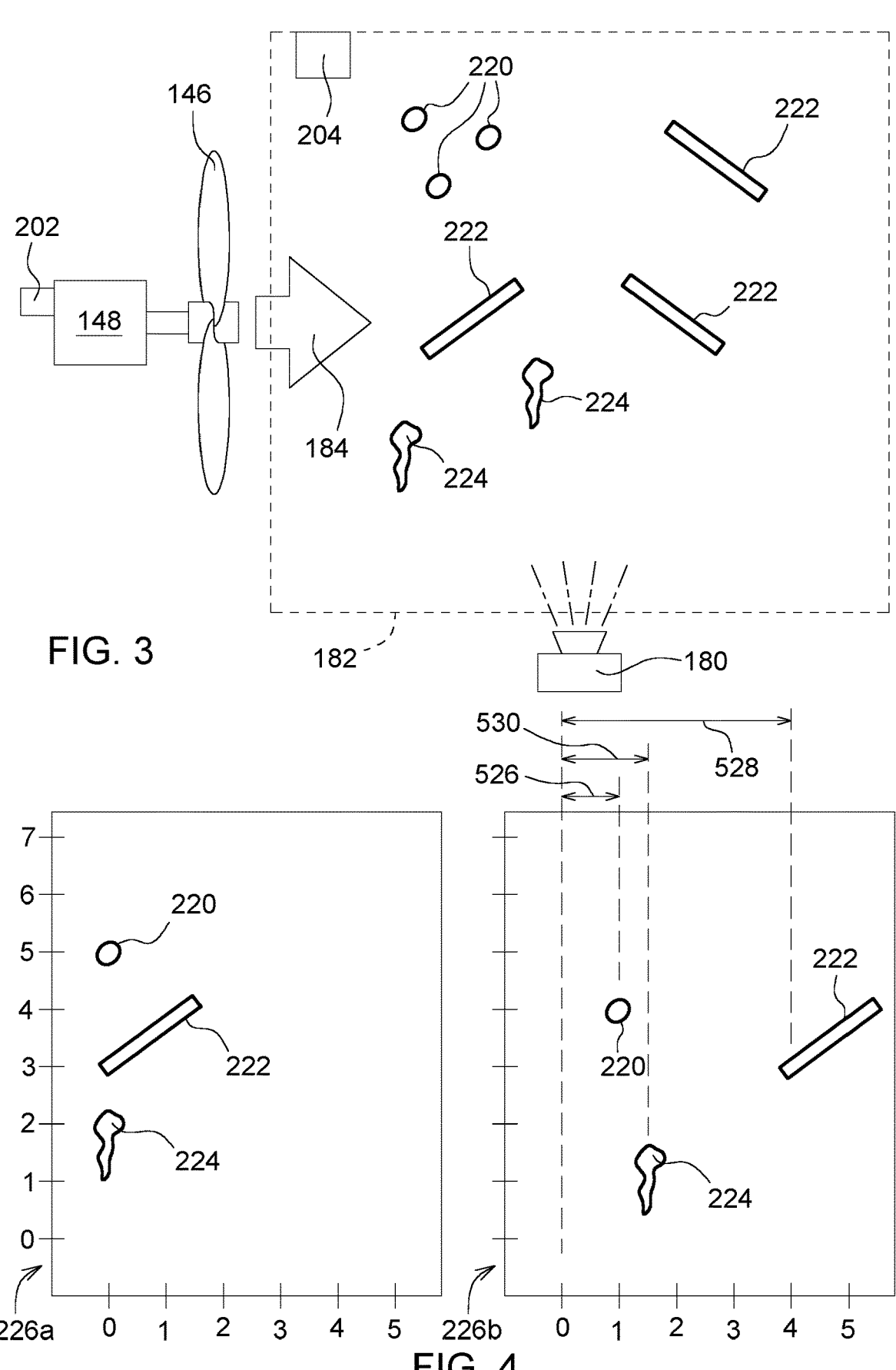
FIG. 3 is a schematic illustration of an image capture sensor and a crop material flow through an image capture area.
FIG. 4 is a schematic illustration of a sequence of images captured by the image capture sensor of FIG. 3.

FIG. 3 schematically illustrates one of the image capture sensors 180 arranged adjacent one of the image capture areas 182. The fan 146 and fan motor 148 are schematically illustrated as generating air flow 184 through the image capture area 182. A fan speed sensor 202 is shown associated with the fan 146. An air speed sensor 204 is schematically shown adjacent the image capture area 182 for directly measuring the speed of air flow through the image capture area 182.

Figure 2:
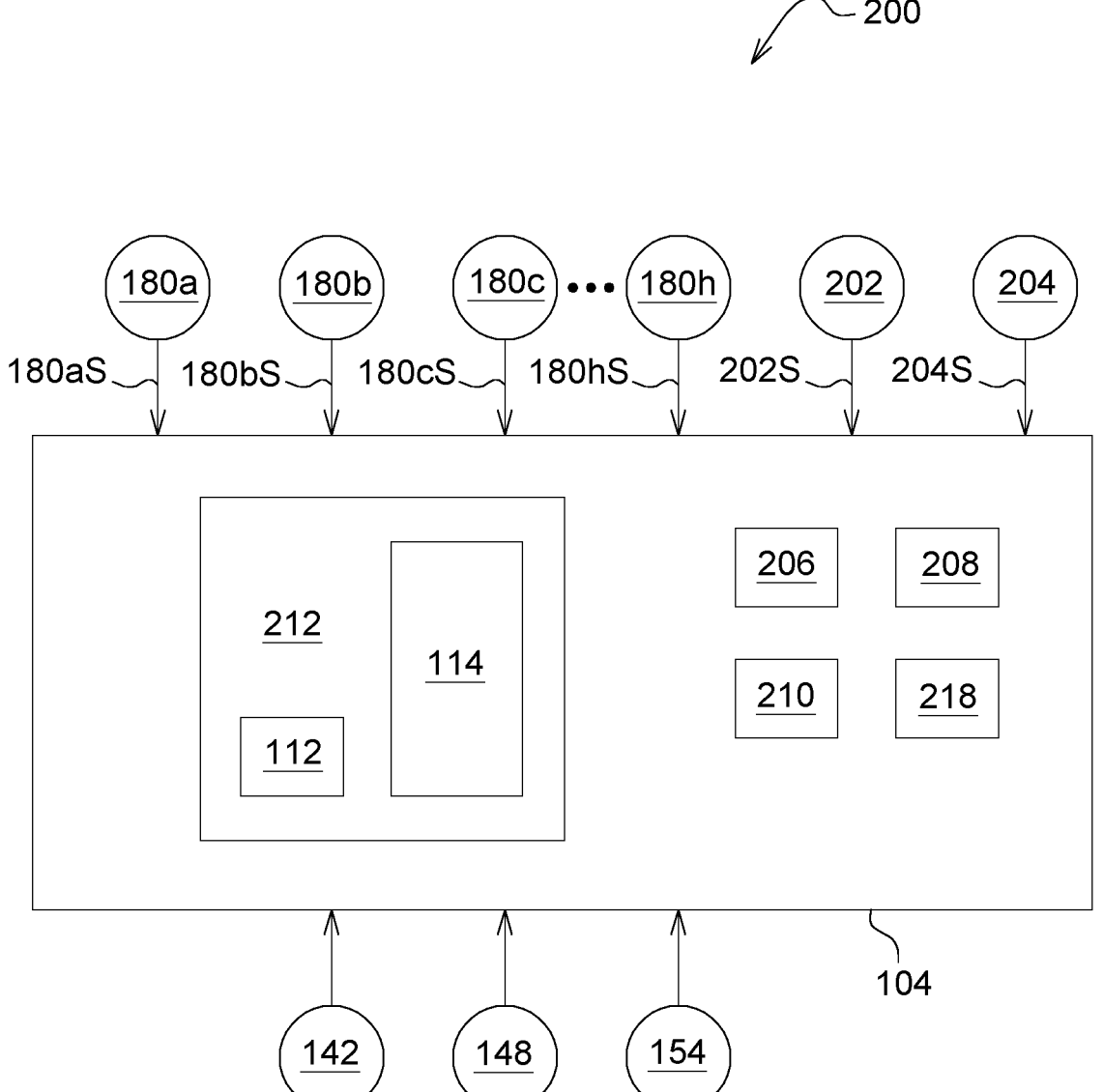
FIG. 2 is schematic illustration of a control system of the grain harvesting machine of FIG. 2.

The Control System:

As schematically illustrated in FIG. 2, the machine 102 includes a control system 200 including the controller 104. The controller 104 may be part of the machine control system of the grain harvesting machine 102, or it may be a separate control module. The controller 104 may for example be mounted in a control panel located at the operator's station 110. Controller 104 is configured to receive input signals from the various sensors. The signals transmitted from the various sensors to the controller 104 are schematically indicated in FIG. 2 by lines connecting the sensors to the controller with an arrowhead indicating the flow of the signal from the sensor to the controller 104.

For example, image signals 180*a*S-180*h*S from the image capture sensors 180*a*-180*h* will be received by controller 104. Controller 104 may also receive a fan speed signal 202S from the fan speed sensor 202 associated with the fan 146. Controller 104 may also receive an air speed signal 204S from the air speed sensor 204 which may be disposed in the grain harvesting machine 102 adjacent any one or more of the image capture areas 182 as schematically shown in FIG. 3. There may be multiple air speed sensors 204 throughout the grain harvesting machine 102.

Similarly, the controller 104 will generate control signals for controlling the operation of various actuators of the grain harvesting machine 102. Those actuators may for example be associated with various subsystems of the grain harvesting machine which affect the grain loss within the machine.

Those actuators may include for example, the concave actuators 142, the fan motor 148, and the actuation arrangement 154 associated with the sieve 150 and chaffer 152, just to name a few.

Controller 104 includes or may be associated with a processor 206, a computer readable medium 208, a data base 210 and an input/output module or control panel 212 having the previously mentioned display 114. The previously mentioned input/output device 112, such as a keyboard, joystick or other user interface, is provided so that the human operator may input instructions to the controller. It is understood that the controller 104 described herein may be a single controller having all of the described functionality, or it may include multiple controllers wherein the described functionality is distributed among the multiple controllers.

Various operations, steps or algorithms as described in connection with the controller 104 can be embodied directly in hardware, in a computer program product 218 such as a software module executed by the processor 206, or in a combination of the two. The computer program product 218 can reside in RAM memory, flash memory, ROM memory, EPROM memory, EEPROM memory, registers, hard disk, a removable disk, or any other form of computer-readable medium 208 known in the art. An exemplary computer-readable medium 208 can be coupled to the processor 206 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The data storage in computer readable medium 208 and/or database 210 may in certain embodiments include a database service, cloud databases, or the like. In various embodiments, the computing network may comprise a cloud server, and may in some implementations be part of a cloud application wherein various functions as disclosed herein are distributed in nature between the computing network and other distributed computing devices. Any or all of the distributed computing devices may be implemented as at least one of an onboard vehicle controller, a server device, a desktop computer, a laptop computer, a smart phone, or any other electronic device capable of executing instructions. A processor (such as a microprocessor) of the devices may be a generic hardware processor, a special-purpose hardware processor, or a combination thereof.

Methods of Operation:

The various methods of operation disclosed herein are based upon an improved detection of grain loss and/or grain quality using image processing of images captured by one or more of the image capture sensors 180.

As schematically shown in FIG. 3 the air flow 184 through the image capture area 182 entrains a crop material flow which may be described as including known grain elements 220, known MOG elements 222 and unknown elements 224 not yet identified as grain or MOG. The image capture sensor 180 may capture a sequential series images 226 such first image 226a and second image 226b schematically shown in FIG. 4.

By appropriate analysis of the images 226a and 226b the unknown elements 224 may be identified and may be subsequently classified as either grain or MOG so that the unknown elements 224 can be properly accounted for thus providing an improved measure of the grain loss or of the grain quality at the image capture area 182 of interest. If the image capture area 182 is internal to the threshing process the data may be used to evaluate the grain quality at that location within grain harvesting machine 102. If the image capture area is at a location where material is being discharged from the grain harvesting machine 102 the data may be used to evaluate the grain loss.

Figure 5A:
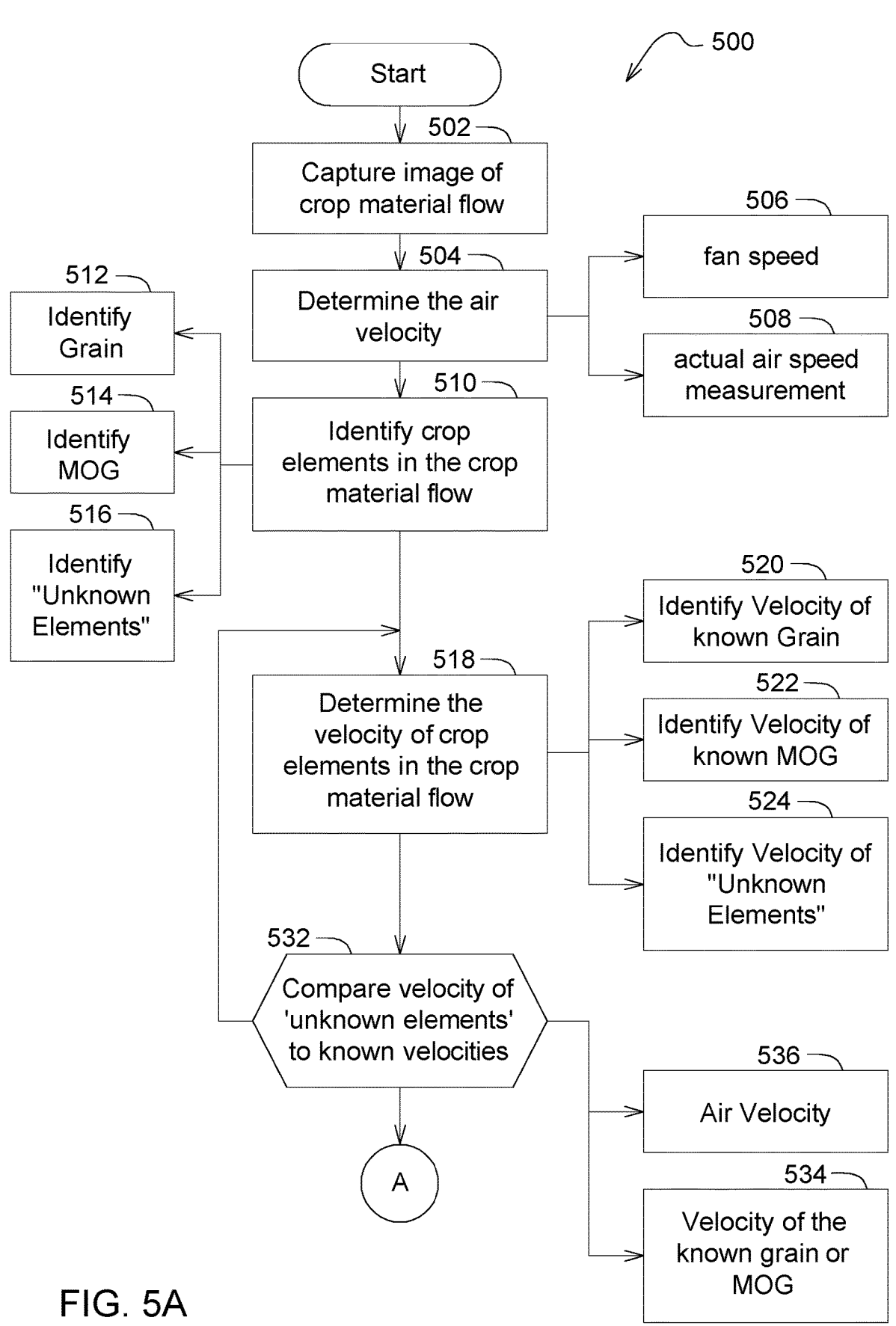
FIGS. 5A-5B comprise a flow chart summarizing a process to determine whether each of the identified unknown elements in the crop material flow is grain or MOG based on the velocity of each of the identified unknown elements.
Figure 5B:
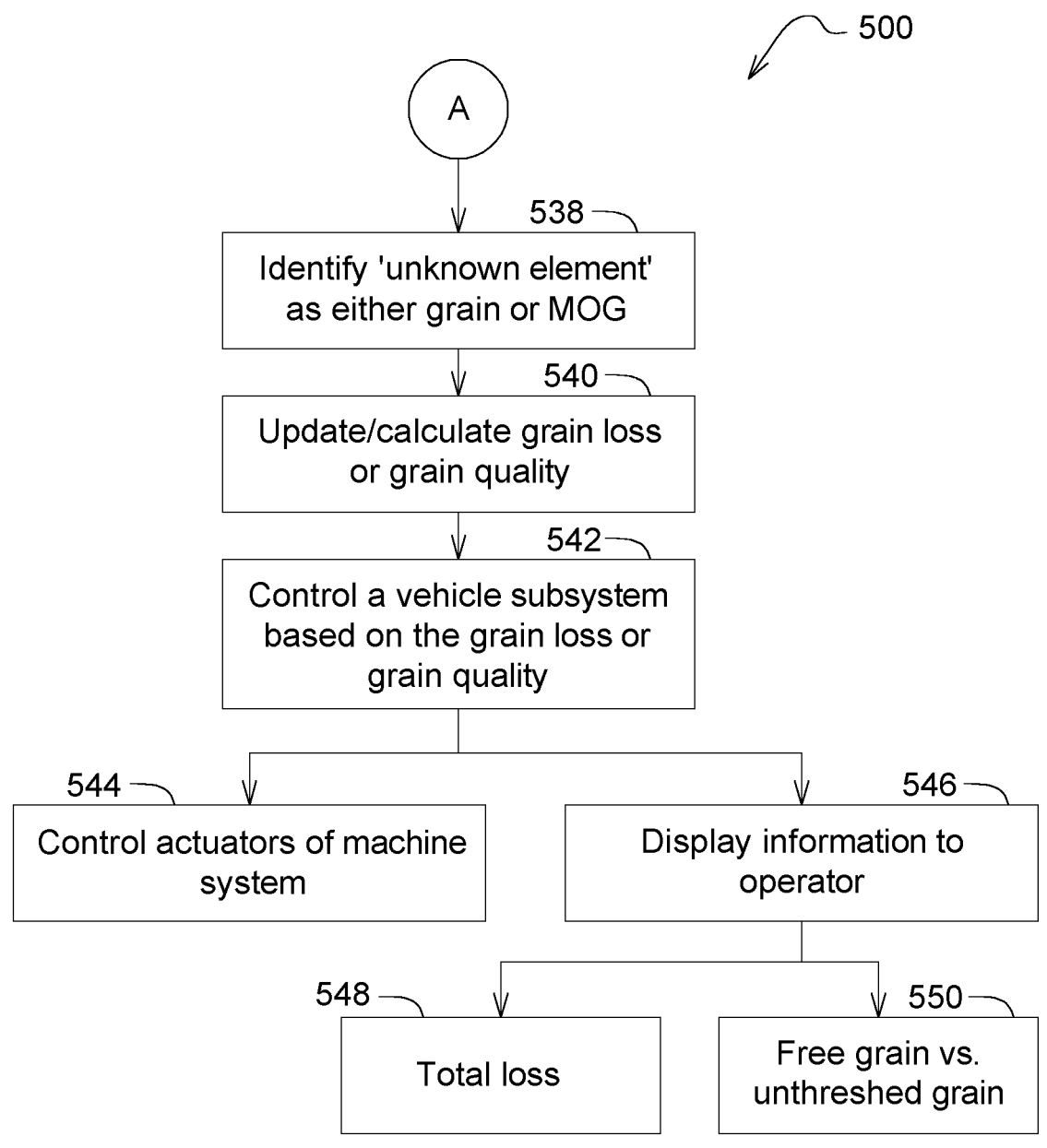

FIGS. 5A and 5B show a flow chart of one embodiment of such a method which may be provided by suitable programming via the computer software 218 of the controller 104. It is noted that some of the steps described below may be omitted in some embodiments of the method. A process 500 may begin with step 502 of capturing an image 226 of crop material flow. The image may be captured as schematically shown in FIG. 3 wherein one of the image capture sensors 180 captures an image of the crop material flow which includes known grain elements 220, known MOG elements 222, and unidentified elements 224.

In step 504 a determination is made of the air velocity of the air flow 184. As indicated at step 506 the determination of the air velocity may be based on a fan speed value of the fan 146 as detected by fan speed sensor 202. Alternatively, as indicated at step 508 the determination of the air velocity may be based on an actual air speed measurement using the air speed sensor 204.

In step 510 crop elements are identified in the crop material flow. As indicated at step 512 this may include identifying the known grain elements 220. As indicated at step 514 the identification of crop elements may include identification of the known MOG elements 222. And as indicated at step 516 the identification of crop elements may include identification of unknown elements 224 as elements other than the known grain elements 220 and the known MOG elements 222.

The identifying of the known grain elements 220 at step 512 and the identification of the known MOG elements 222 at step 514 may be accomplished by analyzing the images such as 226a, 226b using an image processing algorithm to identify known signatures of the known grain elements 220 and the known MOG elements 222. Such image processing algorithms may include use of a neural network. The known signatures may be based on various characteristics of the elements being analyzed, including for example shape of the elements, reflectivity or absorption by the elements of electromagnetic energy of various wavelengths, color of the elements, and any other relevant characteristics. For example, free threshed grain in the form of wheat, beans or corn will each have a characteristic shape and color, which may be considered a signature of those types of grain. Similarly, the respective chaff material associated with each type of grain will have characteristic shapes and/or color which may be considered a signature of those types of MOG. The particular signature of the respective type of grain or its associated MOG will of course also be a function of the type of image capture sensor 180 being used.

Next, at step 518 a determination is made of the velocity of the various elements of the crop material flow. As indicated in sub-steps 520, 522 and 524 this may include identifying the velocity of known grain elements 220, identifying the velocity of known MOG elements 222, and identifying the velocity of unknown elements 224.

One technique for determining the velocity of the various elements in an image includes identifying relative movement of each of the elements between a timed sequential set of images such as images 226a and 226b schematically shown in FIG. 4. For example, in the first image 226a three elements have been identified. One is a known grain element 220. One is a known MOG element 222. Another is an unknown element 224. For the example of FIG. 4 the air stream 184 is moving from left to right through the image. The left to right position of each element within the image can be determined by the distance scale shown at the bottom of the images, and in the first image 226a each element is initially located at position 0. In the second image 226b, which occurs at a known time interval after the first image 226a, these same three elements are seen, but they have moved different distances from left to right as they are carried by the air stream 184. The known grain element 220 has moved a distance 526 of "1 unit" from position 0 to the position 1. The known MOG element 222 has moved a distance 528 of "4 units" from position 0 to position 4. The unknown element 224 has moved a distance 530 of about 1.5 units. Knowing the time difference between images 226a and 226b the velocities of each of the three elements can be calculated.

Also, the velocity of the various elements may be determined by techniques other than comparison of sequential images. For example, the velocity of each element may be measured using a Doppler radar or like sensor in combination with the image capture sensor 180.

Then as indicated at step 532 the velocities of the unknown elements 224 may be compared to various known velocities. More generally, step 532 may be described as determining whether each of the unknown elements 224 is grain or MOG based on the velocity of each of the identified unknown elements 224. The comparison of the velocity of each of the identified unknown elements 224 to known velocities in step 532 may be done in several ways.

As indicated at step 534, one way of determining whether each of the unknown elements 224 is grain or MOG based on the velocity of each of the identified unknown elements 224 is to compare the velocity of each of the identified unknown elements 224 to the velocities of the known grain elements 220 and the known MOG elements 222. For example, using the data seen in FIG. 4 the velocity of the unknown element 224 seen in the second image 226b is much closer to the velocity of the known grain element 220 than it is to the velocity of the known MOG element 222, so the determination could be that the unknown element 224 seen in images 226a and 226b is most probably actually grain. This may be described as comparing the velocity of each of the identified unknown elements 224 to a threshold velocity associated with the known grain elements 220 and/or with the known MOG elements 222. The threshold velocity may for example be a velocity mid-way between the velocities of the known grain elements 220 and the known MOG elements 222, so that the unknown elements 224 are assumed to be identified with the group to which their velocity is closest. This mid-way point, or any other selected threshold value relative to the known velocities of both the known grain elements 220 and the known MOG elements 222, may be described as a threshold velocity based on a comparison of the velocity of at least one of the known grain elements 220 to a velocity of at least one of the known MOG elements 222.

In another example the threshold velocity may be based on a velocity of at least one of the known grain elements 220. For example, any element having a velocity less than a threshold velocity of 110%, or 120% or 130%, or any other selected proportion of the velocity of the known grain element 220 may be assumed to be grain, and any element having a velocity greater than that threshold value may be assumed to be MOG. It will be appreciated that the determination of whether a given unknown element is actually unthreshed grain will be a statistical determination of the probable identity of the element with some level of confidence. The determination may or may not be correct for any one element, but statistically for a large number of elements it will be correct. Furthermore, data may be weighted in relation to the degree of confidence in the data. Reaction times for adjustments in machine parameters to reduce grain loss or improve grain quality may be adjusted depending on the degree of confidence in the data. Data showing a significant deterioration of performance with high degree of confidence will lead to more rapid parameter adjustments.

In another example the threshold velocity may be based on a velocity of at least one of the known MOG elements 222. For example any element having a velocity greater than a threshold velocity of at least 90%, or 80% or 70%, or any other selected proportion of the velocity of the known MOG element 222 may be assumed to be MOG, and any element having a velocity less than that threshold value may be assumed to be grain.

As indicated at step 536, another way of determining whether each of the unknown elements 224 is grain or MOG based on the velocity of each of the identified unknown elements 224 is to compare the velocity of each of the identified unknown elements 224 to the velocity of the air stream 184. As previously noted regarding steps 504, 506 and 508 the velocity of the air stream 184 may be determined or estimated based on fan speed or based on an actual measurement of air speed. In a pneumatic conveying system the assumption is that the MOG elements, which are relatively bulky and light, will be carried along in the air stream 184 at a velocity approximately the same as the air stream velocity. The grain elements, due to their higher density and smaller cross-section, will be carried along significantly more slowly. Thus, a threshold air speed for MOG may be estimated as some percentage of the measured air speed, e.g. 70%, or 80% or 90% of air speed. Any elements moving at a velocity above that threshold may be assumed to be MOG and any elements moving at a velocity below that threshold may be assumed to grain. This may be described as comparing the velocity of each of the identified unknown elements 224 to a threshold velocity based at least in part on an expected air speed or a measured air speed in the image capture area 182.

A further algorithm could include analysis of both the types described above regarding steps 534 and 536 and a comparison of those results.

In a still further embodiment the algorithm may consider a threshold velocity based at least in part on a velocity due to gravity. For example, looking again at the two sequential images 226a and 226b of FIG. 4, and assuming that the image capture area 182 is oriented such that horizontal movement through the images corresponds to horizontal movement relative to the ground, and vertical movement through the images corresponds to vertical movement relative to the ground, then the downward movement of elements in the image may be considered to be due at least in part to the effect of gravity. As seen in FIG. 4, the elements 220 and 224 are shown to have dropped as they are passing through the image capture area 182, whereas the known MOG element 222 is seen to have stayed at about the same elevation. In a manner similar to that described above for measuring horizontal velocities of the various elements in the images 226a and 226b, the controller 104 may measure vertical velocities due at least in part to gravity. Although the force of gravity will of course act equally on all of the elements, the less dense MOG will tend to have a greater drag resistance to downward acceleration and thus will have a relatively smaller downward velocity as compared to the more dense grain. Additionally in the shoe area the air flow is also moving "up" to some degree, so the upward air flow also contributes to the MOG staying more aloft.

As indicated at step 538, using any one or combination of the analytical techniques described above, each of the unknown elements 224 is identified as either grain or MOG. Then as indicated at step 540 the controller 104 will update and/or calculate grain loss or grain quality. If the data is taken at a location such as 180c corresponding to material being released from the grain harvesting machine 102, the controller 104 may update and/or calculate a total grain loss as including all of the elements originally identified as known grain elements 220 and all of the additional unknown elements 224 which have been identified as probably being grain. If the data is taken at a location such as 180a, 180b or 180d corresponding to an internal step in the threshing process, the controller 104 may update and/or calculate a grain quality at that location.

Then as indicated at step 542 a vehicle subsystem can be controlled by controller 104 based on this updated grain loss or grain quality calculation which includes the consideration of initially unknown elements 224 which have been identified as probably being grain. This may be described as controlling a subsystem of the grain harvesting machine 102 at least in part based upon the determination of whether each of the identified unknown grain elements 224 is grain or MOG. The particular vehicle subsystem to be controlled may depend upon the location of the image capture sensor 180 and the associated image capture area 180. For example as indicated by step 544, if the image capture sensor is located at position 180a in the area of the threshing device or separator 136, the settings of the threshing device or separator 136 may be adjusted by controlling one or more of the actuators associated with the threshing device or separator 136, or perhaps one of the actuators of the subsystems upstream of the threshing device or separator 136 such as the header 118, or the feederhouse 120, or the guide drum 134, or the like.

If on the other hand the image capture sensor is in the location 180b in the area of the cleaning shoe 144, adjustments may be made to one or more of the actuators of the cleaning shoe 144 to minimize grain loss in that area.

In addition to providing automatic control of various machine subsystems to reduce grain loss in those subsystems, the controller 104 may display grain loss information to the operator of the grain harvesting machine 102 as indicated at step 546. This display may be presented for example on the display device 114 located in the operator's cabin 110. As indicated at step 548 the displayed information may include a display of "total loss" of grain which would include a count of both the known grain elements 220 and the initially unknown elements 224 which have been identified through the processes described above as probably being grain. And as indicated at step 550 the displayed information may include separate data on "free grain" which would be the known grain elements 220 and "unthreshed grain" which would be those initially unknown elements 224 which have been identified through the processes described above as probably being grain.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of operating a grain harvesting machine, the method comprising:

capturing images of a crop material flow in an image capture area of the grain harvesting machine, the crop material flow including known grain elements, known material other than grain (MOG) elements, and unknown elements not yet identified as grain or MOG;

identifying one or more of the unknown elements in the images;

determining a velocity of each of the identified unknown elements;

based on the velocity of each of the identified unknown elements, determining whether each of the identified unknown elements is grain or MOG; and controlling a subsystem of the grain harvesting machine at least in part based upon the determination of whether each of the identified unknown elements is grain or MOG;

wherein determining whether each of the identified unknown elements is grain or MOG includes comparing the velocity of each of the identified unknown elements to a threshold velocity.

2. The method of claim 1, wherein:

identifying one or more of the unknown elements in the images includes identifying the known grain elements and known MOG elements and identifying the unknown elements as elements other than the known grain elements and known MOG elements.

3. The method of claim 2, wherein:

the identifying of the known grain elements and known MOG elements includes analyzing the images using an image processing algorithm to identify known signatures of the known grain elements and known MOG elements.

4. The method of claim 1, wherein:

determining a velocity of each of the identified unknown elements includes identifying relative movement of each of the identified unknown elements between a timed sequential set of the images.

5. The method of claim 1, wherein:

the threshold velocity is based at least in part on an expected air speed in the image capture area of the grain harvesting machine.

6. The method of claim 5, wherein:

the expected air speed is based at least in part on a measured air speed detected by an air speed sensor.

7. The method of claim 5, wherein:

the expected air speed is based at least in part on a fan speed value.

8. The method of claim 1, wherein:

the threshold velocity is based at least in part on a velocity of at least one of the known grain elements.

9. The method of claim 1, wherein:

the threshold velocity is based at least in part on a velocity of at least one of the known MOG elements.

10. The method of claim 1, wherein:

the threshold velocity is based at least in part on a velocity due to gravity.

11. The method of claim 1, wherein:

the threshold velocity is based at least in part on a comparison of a velocity of at least one of the known grain elements to a velocity of at least one of the known MOG elements.

12. The method of claim 1, wherein:

capturing images is performed with an image capture sensor located at one or more locations on the grain harvesting machine, at least one of the one or more locations being selected from the group consisting of a cleaning shoe, a separator, a residue processing system and a tailings handling system.

13. A grain harvesting machine for harvesting a crop material and separating the crop material into grain and material other than grain (MOG), comprising:

a plurality of machine subsystems affecting separation of the grain from the MOG;

at least one image capture sensor configured to capture images of a crop material flow in an image capture area of the grain harvesting machine; and a controller configured to:

identify one or more elements of the crop material flow in the images as known grain elements, known MOG elements, or unknown elements;

determine a velocity of each of the identified unknown elements;

determine whether each of the identified unknown elements is grain or MOG based at least in part on the velocity of each of the identified unknown elements; and control at least one of the subsystems of the grain harvesting machine based at least in part on the determination of whether each of the identified unknown elements is grain or MOG;

wherein the controller is configured such that the determining whether each of the identified unknown elements is grain or MOG based at least in part on the velocity of each of the identified unknown elements includes comparing the velocity of each of the identified unknown elements to a threshold velocity.

14. The grain harvesting machine of claim 13, wherein:

the controller is configured such that the identifying one or more elements of the crop material flow in the images as known grain elements, known MOG elements, or unknown elements includes identifying relative movement of each of the identified unknown elements between a timed sequential set of images captured by the image capture sensor.

15. The grain harvesting machine of claim 13, further comprising:

an air speed sensor configured to measure an air speed through the image capture area; and wherein the controller is configured such that the threshold velocity is based at least in part on an air speed measured by the air speed sensor.

16. The grain harvesting machine of claim 13, further comprising:

a fan speed sensor configured to measure a fan speed of a fan generating an air flow through the image capture area; and wherein the controller is configured such that the threshold velocity is based at least in part on an expected air flow speed based on the fan speed.

17. The grain harvesting machine of claim 13, wherein: the controller is configured such that the threshold velocity is based at least in part on a velocity of at least one of the known grain elements and/or a velocity of at least one of the known MOG elements.

18. The grain harvesting machine of claim 13, wherein: the at least one of the subsystems is selected from the group consisting of a cleaning shoe, a separator, a residue processing system and a tailings handling system.

\* \* \* \* \*